United States Patent

[11] 3,556,125

| [72] | Inventor | Dennis Stephen Dowdall |
| | | Morden, Surrey, England |
| [21] | Appl. No. | 809,084 |
| [22] | Filed | Mar. 21, 1969 |
| [45] | Patented | Jan. 19, 1971 |
| [73] | Assignee | Telektron Limited |
| | | West Molesey, Surrey, England |
| [32] | Priority | Mar. 26, 1968 |
| [33] | | Great Britain |
| [31] | | No. 14525/68 |

[54] PRESSURE REGULATING VALVES
8 Claims, 2 Drawing Figs.

[52] U.S. Cl. ............................................. 137/116.3,
137/115, 137/116.5
[51] Int. Cl. .............................................. G05d 16/06
[50] Field of Search .................................. 137/116.3,
484.6, 116.5, 115, 116

[56] References Cited
UNITED STATES PATENTS
2,826,213  3/1958  Wright .......................... 137/116.3
2,940,462  6/1960  Johanson ....................... 137/116.3

*Primary Examiner*—William F. O'Dea
*Assistant Examiner*—William H. Wright
*Attorney*—Norman S. Blodgett ABSTRACT: The invention provides a pressure-regulating valve which is usable, for example to obtain a controlled reduction in fluid pressure or as a position transmitter. The valve of the invention comprises a first chamber 21 and a second chamber 20 separated by a flexible diaphragm 14. The periphery of the diaphragm can separate from ledge 26 and a dished member 15 so as to allow loss of air or other gas from either of the chambers. The member 15 is biased against the diaphragm 14 by a spring (bias member 2,) which can be varied in compression. A moving valve member 7 is attached to the diaphragm and seats on member 5. A duct 8 in the valve member 7 provides fluid connection between the inlet port 23 and the first chamber 20. When member 7 lifts from seat member 5 fluid passes from the inlet to outlet port 22 via chamber 21.

INVENTOR
Dennis Stephen Dowdall
By Norman S. Blodgett
ATTORNEY

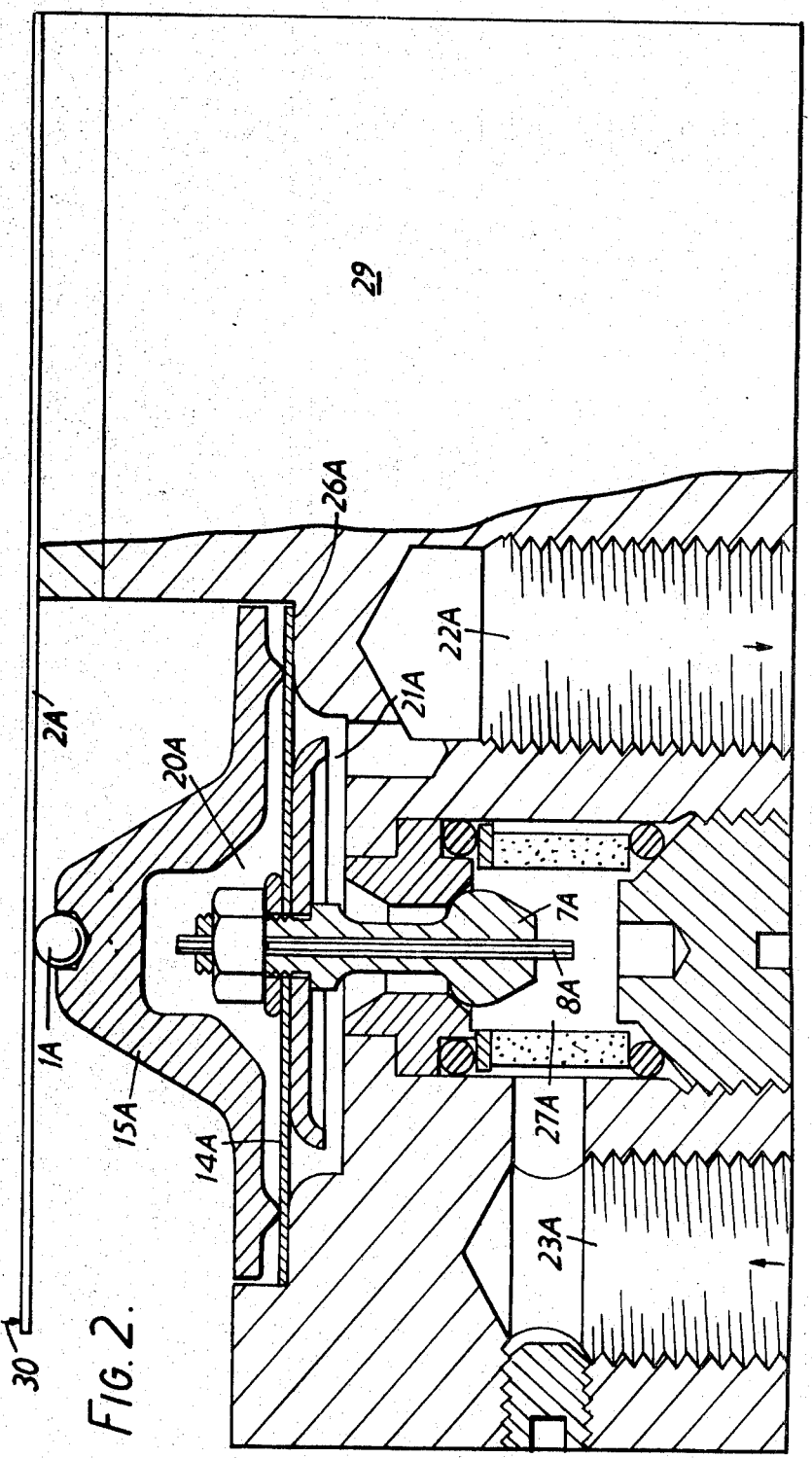

PRESSURE REGULATING VALVES

CROSS REFERENCE TO RELATED APPLICATION

Applicant claims priority under 35 U.S.C. 119 for Application 14525/68 filed Mar. 26, 1968 in the Patent Office of the United Kingdom.

This invention relates to pressure-regulating valves. The use of air or other gas to operate devices is well known and it is frequently necessary to feed a device with air or other gas at a pressure below that available in the factory or site. In this situation a pressure-regulating valve is positioned between the device and the supply. Such a valve allows a series of devices each having a different operating pressure to be fed from a single supply having at least the highest pressure required for the devices. The term fluid used herein is intended to include air or other operating gas.

Fluid pressures for instruments, for example air gauges often have to be retained within close tolerances and the valve according to the invention allows precision regulation to be achieved.

The invention provides a fluid pressure-regulating valve comprising a first chamber and a second chamber separated by a peripherally free diaphragm, which allows fluid to pass from either of the chambers to ambient and is connected to the moving valve member of a valve positioned between the inlet port and the first chamber, which has the outlet port, and a fluid connection between the inlet port and the second chamber.

The second chamber is preferably formed by a member extending over the diaphragm and biased against it to contact the diaphragm at its periphery. Fluid then passes from the second chamber to ambient by moving the member against the biasing force to form a narrow gap between the member and diaphragm.

The diaphragm is retained normally on its seat by the pressure in the second chamber.

The fluid connection between the input port and the second chamber may be formed by a duct extending through the diaphragm and the moving valve member.

The invention provides a valve in which the regulation of pressure reduction is achieved with a simple construction. No sliding parts are necessary and hence there is a reduced need for lubrication.

Two embodiments of a pressure regulator valve according to the invention will now be described by way of example with reference to the accompanying diagrammatic drawings in which:

FIG. 2 is an axial section through a second embodiment which is used as a position transmitter.

Figure 1:
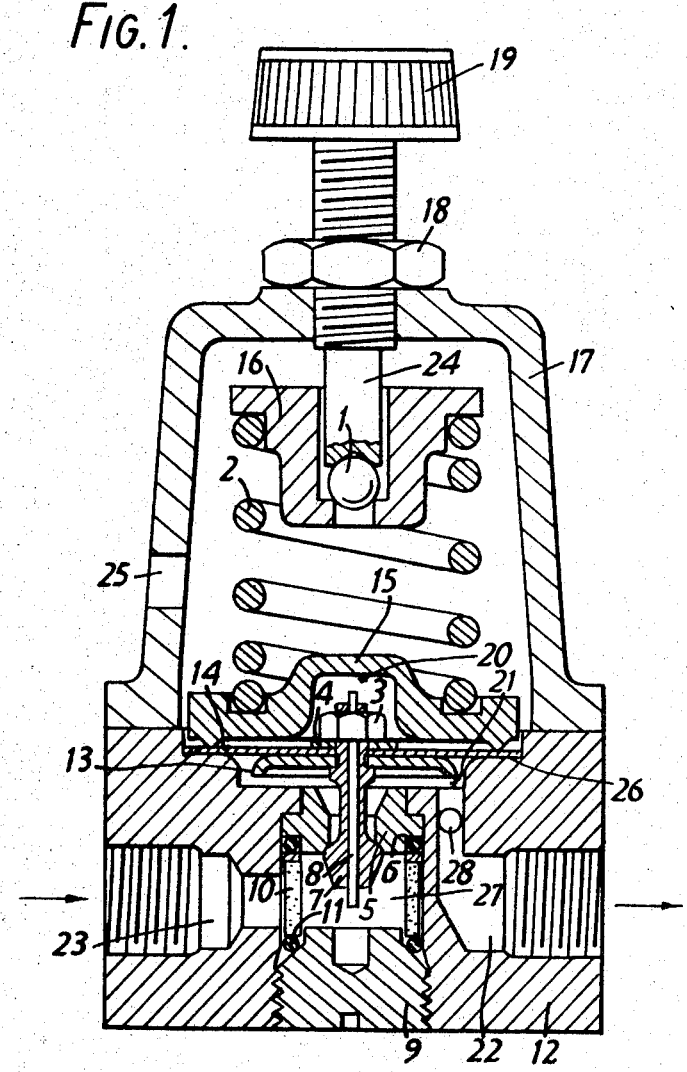
FIG. 1 is an axial section through one embodiment.

The valve shown in FIG. 1 comprises a housing base 12 to which is affixed, by means not shown, a housing cap 17. Although the terms base and cap are used herein the valve can be affixed to a supporting surface in any position and not necessarily with the base under the cap. The base has a high pressure inlet port 23 entering at one side thereof and a reduced pressure outlet port 22 leaving the housing base. The inlet port 23 passes through a filter 10 into a supply chamber 27. The filter removes dust from the inlet fluid which could affect the operation of the valve. The filter element is retained in a valve seat member 5 and is supported in the housing base by means of housing rings 6 and 11 and a base plug 9 which screws into housing base. The valve seat member is of annular form and its surface into the supply chamber 27 is chamfered to form a valve seat surface which receive a valve member 7. An elongated part of this valve member extends towards the housing cap, through the central aperture in a seat member 5, into a control chamber 21. The reduced pressure outlet port 22 communicates with this control chamber. Therefore when the valve member lifts from the valve surface by moving into the supply chamber 27, the inlet and outlet ports come into communication and fluid can flow between them.

The housing cap contacts the base along an annular surface and adjacent this surface the housing base is stepped to provide a diaphragm shelf 26 which supports a flexible diaphragm 14. This diaphragm consists of a resilient material or alternatively a flexible plate (for example a plate having circular corrugations). The diaphragm is connected to the valve member 7 by means of a nut 3 which cooperates with a threaded part of the valve member extending through the diaphragm. A sealing ring 4 is positioned between the nut and the surface of the diaphragm and a diaphragm plate 13 is provided adjacent the surface of the diaphragm facing the control chamber 21. Therefore it will be appreciated that movement of the central part of the diaphragm towards the housing base will cause the valve member 7 to separate from the valve surface on the member 5.

The diaphragm is retained on the shelf 26 by a loading disc 15 which has an annular ridge which contacts the free surface of the diaphragm. The loading disc is dished to provide space for the nut 3 and also to provide a pilot chamber 20. A duct 8 of small sectional area is axially positioned in the valve member so that fluid communication is provided between the base chamber 27 and the pilot chamber 20. The duct 8 is conveniently formed of a hypodermic needle or similar tube of a small diameter.

The loading disc 15 is retained in contact with the diaphragm 14 by a main spring 2 of helical form which is supported at its other end by a spring seat 16. The disc is therefore biased towards the base 12 by a certain pressure which can be varied by varying the compression in the spring 2. A rod 24 extends into the housing cap 17 and cooperates with this cap along a threaded length. The end of the rod extending into the cap 17 forms a seat for a ball 1 positioned between the rod and the spring seat 16. The rod is rotatable by the knob 19 so as to vary the compression in the spring 2 and hence the loading pressure applied to the disc 15. A locknut 18 is provided to clamp the rod at its selected position.

The interior volume of the housing cap 17 communicates with the ambient atmosphere through a port 25. A monitoring duct 28 is provided in the outlet port 22 so that the reduced pressure can be monitored.

From the previous description and the FIG. it will be seen that the fluid entering through the port 23 can leave the valve by following three paths. In the first path the valve member will be positioned away from its seat and fluid will therefore flow through this valve into the control chamber 21 and out through the port 22.

The second fluid path occurs when fluid flows through the duct 8 into the pilot chamber 20 and (if the pressure is sufficient to move the loading disc 15 against the loading pressure so as to move the loading disc out of contact with the diaphragm 14) out through the housing port 25.

The periphery of the diaphragm 12 is movable from shelf 26 to allow fluid to pass from the control chamber 21 into the housing cap and thence through the port 25. This situation will occur when the tension in the spring 2 is reduced so that the pressure applied to the periphery is not large enough to hold it in contact with the shelf 26 against the pressure in chamber 21. This provides the third path.

The embodiment shown in FIG. 2 is similar in construction to that shown in FIG. 1 but uses a different biasing means to bias the loading disc 15A against the diaphragm 14A. A leaf spring 2A is carried rigidly on a block 29 and extends across the loading disc 15A being spaced therefrom by a ball 1A. A variable mechanical contact is applied at point 30 which allows the pressure exerted by the spring 2A on ball 1A to be selected.

The embodiment shown in FIG. 2 can also be used as a position transmitter and the point 30 is then connected to a connection from a device having a position parameter which it is necessary to indicate. As this position parameter varies the force applied at point 30 is also varied and the reduced outlet pressure obtained at port 22A also varies. Therefore, with a high input pressure supplied to port 23A the variation in position function function of a device is converted by the valve into a fluid pressure function. This fluid pressure function may then be used to operate an indicating device at a remote station.

The operation of the valves according to the invention will now be described. The reference numerals used refer to FIG. 1 but it will be appreciated that the same references are used in FIG. 2 with a suffix A The two embodiments differ only as to means for exerting mechanical pressure on the loading disc. Fluid supplied enters through port 23 and into the pilot chamber 20 at a controlled rate through the duct 8. Fluid escapes from the pilot chamber 20 through the pressure relief valve formed by the surface of the diaphragm 14 and the annular ridge on disc 15. The rate of fluid escape is dependent on the loading pressure applied by the main spring 2 so that the pressure in the pilot chamber is thus proportional to the loading pressure applied by spring 2. The pressure in the pilot chamber 20 is applied to the valve member 7 via the diaphragm 14 and movement of the member allows fluid to pass into the control chamber 21 and thus to the outlet port 22. The valve remains in this open position on while the pressure in the pilot chamber 20 is in excess of the pressure in control chamber 21. The valve member 7 moves towards the valve surface to close the valve as the pressure in the control chamber 21 approaches that in the pilot chamber 20. The valve will close when the required pressure is present in the control chamber.

If the force applied by the main spring is reduced the loading pressure on the disc 15 will also be reduced and fluid will escape from the pilot chamber 20 so that the pressure therein falls. The diaphragm will then lift off its seat on to the shelf 26 and allow pressure in the control chamber 21 and the output lines to fall until the diaphragm again has balanced pressure on each face.

The regulator of the invention may be used in two basic application. In the first application there is a continuous flow through the valve so that a fluid flow is supplied at a regulated pressure. The fluid flows from the inlet port 23 to give a constant leak from the pilot chamber 20 between the loading disc 15 and diaphragm 14. The pressure in the pilot chamber is sufficient to depress the diaphragm to a small extent so that the fluid follows the first path and leaves the valve through port 22. Reduction in the pressure is obtained by the pressure drop occurring at the narrow annular passage between the valve member 7 and its valve surface.

In the second application fluid under a regulated pressure is supplied to a line which has a dead end i.e. flow through the line does not occur. The pressure in the outlet 22 is determined by the pressure in the pilot chamber and the normal position of the valve member 7 is closed. If the pressure in the line falls below the desired pressure (for example due to a leak) then the valve will open for a short period to increase the output pressure.

It will be appreciated that the diaphragm of the valve according to the invention is pressurized on both sides driving operation by substantially equal pressures and this improves its reliability and reduces the possibility of failure due to diaphragm bursting.

The fluid communication between the input port and the second chamber in the valves of the invention will be of small gauge. This requirement occurs because there will, in normal operation of the valve, be a continuous loss of fluid from the second chamber over the periphery of the diaphragm. It is required that this operating loss will be as low as possible because this loss occurs from the fluid under pressure supplied to the device. The diameter of the fluid connection will therefore be kept as low as possible while allowing a flow of fluid sufficient to operate the valve efficiently.

I claim:
1. A fluid pressure-regulating valve comprising in combination:
   a. a first chamber;
   b. a second chamber;
   c. a diaphragm separating said chambers, the periphery of said diaphragm being movable to allow release of fluid from said chambers;
   d. an inlet port;
   e. a movable valve member, positioned between said inlet port and said first chamber, and connected to said diaphragm; and
   f. a fluid connection between said inlet port and said second chamber.

2. A regulating valve according to claim 1 wherein a member extends over the diaphragm and separably contacts same at or near its periphery to form said second chamber and including a biasing member acting on said member and including a biasing member acting on said member to bias same onto said diaphragm, the member being movable from said diaphragm to release fluid from said second chamber.

3. A regulating valve according to claim 2, wherein the biasing member is variable to allow movement of the biased member from the diaphragm at a particular fluid pressure in the second chamber.

4. A regulating valve according to claim 1 wherein a duct extending through the movable valve member forms the fluid connection between the inlet port and the second chamber.

5. A regulating valve according to claim 1 including an annular valve seat through which the movable valve member extends.

6. A regulating valve according to claim 1 wherein the diaphragm is separable at its periphery from an annular seat to allow release of fluid from the first chamber.

7. A regulating valve according to claim 3 including a helical spring as the biasing member, the compression in which can be varied.

8. A regulating valve according to claim 3 including a cantilevered spring as the biasing member to which a variable force can be applied.